(12) United States Patent
Hirano

(10) Patent No.: US 10,540,128 B2
(45) Date of Patent: Jan. 21, 2020

(54) INFORMATION PROCESSING APPARATUS THAT PERFORMS SHORT-RANGE WIRELESS COMMUNICATION, CONTROL METHOD THEREFOR, AND STORAGE MEDIUM

(71) Applicant: CANON KABUSHIKI KAISHA, Tokyo (JP)

(72) Inventor: Tsubasa Hirano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/126,374

(22) Filed: Sep. 10, 2018

(65) Prior Publication Data

US 2019/0079711 A1 Mar. 14, 2019

(30) Foreign Application Priority Data

Sep. 14, 2017 (JP) .................................. 2017-176993

(51) Int. Cl.
*G06F 3/12* (2006.01)
*H04W 4/80* (2018.01)
(Continued)

(52) U.S. Cl.
CPC .......... *G06F 3/1231* (2013.01); *G06F 3/1204* (2013.01); *H04B 7/15528* (2013.01);
(Continued)

(58) Field of Classification Search
CPC .......... H04N 1/00307; H04N 1/00127; H04N 1/00281; H04N 1/00408; H04N 1/00413
(Continued)

(56) References Cited

U.S. PATENT DOCUMENTS 9,836,260 B2 12/2017 Iwauchi
2011/0177780 A1* 7/2011 Sato ..................... H04W 36/14
455/41.1
(Continued)

FOREIGN PATENT DOCUMENTS

EP 2963905 A2 1/2016
EP 3291509 A1 3/2018
(Continued)

OTHER PUBLICATIONS

Extended European Search Report issued in European Appln. No. 18193601.4 dated Jan. 31, 2019.
(Continued)

*Primary Examiner* — Christopher Wait
(74) *Attorney, Agent, or Firm* — Rossi, Kimms & McDowell LLP

(57) ABSTRACT

An information processing apparatus capable of providing an appropriate IP address to a mobile terminal in which a network service discovery protocol does not function. The information processing apparatus has a plurality of lines assigned with different pieces of address information, and is configured to transmit short-range wireless-communication information, in which address information regarding one line out of the plurality of lines is set, to a communication destination via short-range wireless communication. The information processing apparatus comprises a setting unit configured to preferentially set, into the short-range wireless-communication information, address information regarding a line, out of the plurality of lines, in which a relay device for performing intercommunication between different protocols is provided between the information processing apparatus and the communication destination.

15 Claims, 9 Drawing Sheets

(51) Int. Cl.
  *H04B 7/155* (2006.01)
  *H04L 29/06* (2006.01)
(52) U.S. Cl.
  CPC ............... *H04L 69/18* (2013.01); *H04W 4/80* (2018.02); *G06F 3/1292* (2013.01)
(58) Field of Classification Search
  USPC ...................................................... 358/1.13
  See application file for complete search history.

(56) References Cited

U.S. PATENT DOCUMENTS

| | | |
|---|---|---|
| 2012/0113459 A1 | 5/2012 | Williams et al. |
| 2013/0250358 A1 | 9/2013 | Suzuki |
| 2014/0009786 A1* | 1/2014 | Sako ..................... G06F 3/1292 |
| | | 358/1.15 |
| 2014/0268221 A1 | 9/2014 | Sako |
| 2015/0077790 A1 | 3/2015 | Nagasawa |
| 2016/0350035 A1 | 12/2016 | Horikoshi |
| 2018/0063364 A1 | 3/2018 | Nagasawa |
| 2019/0020766 A1 | 1/2019 | Omori |

FOREIGN PATENT DOCUMENTS

| | | |
|---|---|---|
| JP | 2016018283 A | 2/2016 |
| WO | 2017073017 A1 | 5/2017 |

OTHER PUBLICATIONS

Search Report and Written Opinion issued in Singapore Appln. No. 10201807615V dated Jun. 10, 2019.

\* cited by examiner

INFORMATION PROCESSING APPARATUS THAT PERFORMS SHORT-RANGE WIRELESS COMMUNICATION, CONTROL METHOD THEREFOR, AND STORAGE MEDIUM

BACKGROUND OF THE INVENTION

Field of the Invention

The present invention relates to an information processing apparatus, a control method for the information processing apparatus, and a storage medium. Particularly, the present invention relates to an information processing apparatus that performs short-range wireless communication, a control method for the information processing apparatus, and a storage medium.

Description of the Related Art

An MFP has been known as an information processing apparatus that performs printing on the basis of print data acquired from a mobile terminal. A user uses a mobile terminal to search for an MFP capable of performing printing processing (hereinafter, referred to as an "available MFP for printing"). For example, the mobile terminal performs search processing for an available MFP for printing from a plurality of communication apparatuses belonging to the same network as the mobile terminal belongs to, with a network service discovery protocol, such as multicast DNS (mDNS). When having found an available MFP for printing, the mobile terminal acquires the IP address of the available MFP for printing from the available MFP for printing, and transmits print data to the available MFP for printing while specifying the acquired IP address.

In a case where an available MFP for printing is connected to a subnet to which the mobile terminal is connected, the mobile terminal can find the available MFP for printing, in the search processing. Meanwhile, in a case where an available MFP for printing is connected to another subnet connected, through a gateway not supporting mDNS, to the subnet to which the mobile terminal is connected, the mobile terminal cannot find the available MFP for printing. In contrast to this, a technique of transmitting short-range wireless-communication information including the IP address of an MFP, from the MFP to a mobile terminal via short-range wireless communication, is proposed (refer to Japanese Laid-Open Patent Publication (kokai) No. 2016-018283). The mobile terminal accesses the acquired IP address, so that the mobile terminal can transmit print data to the MFP in which mDNS does not function due to the specifications of a gateway.

In recent years, an MFP having a plurality of lines (hereinafter, referred to as a "multiple-line MFP") has been developed, the multiple-line MFP being capable of using a plurality of different networks appropriately. For example, the multiple-line MFP uses a large-scale network including a plurality of subnets connected through a gateway, as a main line. The multiple-line MFP uses a small-scale network including only one subnet, with no gateway, as a sub-line. The multiple-line MFP has respective IP addresses assigned to the lines, the IP addresses of the lines being different from one another.

In a case where an IP address is transmitted to a mobile terminal in short-range wireless communication in the use of the multiple-line MFP, it is also necessary to set the IP address in short-range wireless-communication information, wherein only one IP address can be set in the short-range wireless-communication information. There is a possibility that mDNS does not function due to the specifications of the gateway in the main line, out of the main line and the sub-line, used for the large-scale network including the gateway, in the multiple-line MFP. From the viewpoint of provision of an appropriate IP address to a mobile terminal in which mDNS does not function, the multiple-line MFP preferably has the IP address of the main line, out of the main line and the sub-line, set in the short-range wireless-communication information.

However, because an IP address to be set in the short-range wireless-communication information is determined from all IP addresses assigned to the multiple-line MFP, the IP address of the main line is not always set in the short-range wireless-communication information, in the multiple-line MFP. That is, the conventional MFP cannot provide an appropriate IP address to a mobile terminal in which mDNS does not function.

SUMMARY OF THE INVENTION

The present invention provides an information processing apparatus capable of providing an appropriate IP address to a mobile terminal in which a network service discovery protocol does not function, a control method for the information processing apparatus, and a storage medium.

Accordingly, the present invention provides an information processing apparatus having a plurality of lines assigned with different pieces of address information, the information processing apparatus being configured to transmit short-range wireless-communication information, in which address information regarding one line out of the plurality of lines is set, to a communication destination via short-range wireless communication, comprising a setting unit configured to preferentially set, into the short-range wireless-communication information, address information regarding a line, out of the plurality of lines, in which a relay device for performing intercommunication between different protocols is provided between the information processing apparatus and the communication destination.

According to the present invention, the appropriate IP address can be provided to the mobile terminal in which the network service discovery protocol does not function.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
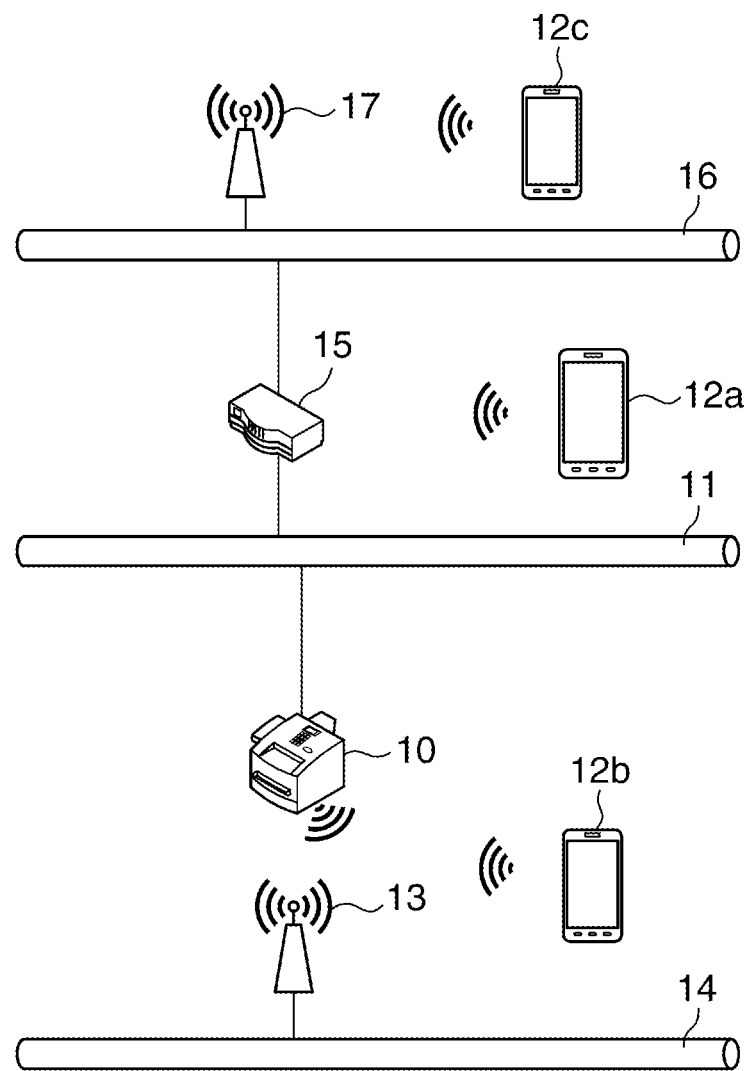
FIG. 1 is a diagram for describing the network configuration of an MFP as an information processing apparatus according to an embodiment of the present invention.

FIG. 1 is a diagram for describing the network configuration of an MFP 10 as an information processing apparatus according to an embodiment of the present invention.

The MFP 10 is connected to a LAN 11 via a wired LAN, to perform wired LAN communication with a communication apparatus belonging to the LAN 11, for example, a mobile terminal 12a. The MFP 10 is connected to a LAN 14 via a wireless LAN through an access point 13, to perform wireless LAN communication with a communication apparatus belonging to the LAN 14, for example, a mobile terminal 12b. With a network service discovery protocol, the mobile terminals 12a and 12b each performs search processing for a communication apparatus that provides a desired service on a network. Examples of the network service discovery protocol include mDNS, Web Service Discovery (WS-Discovery), and Simple Service Discovery Protocol (SSDP). For example, with mDNS, the mobile terminal 12a finds the MFP 10 having a printing function, from a plurality of communication apparatuses belonging to the LAN 11, to acquire the IP address of the MFP 10 from the MFP 10. The mobile terminal 12a specifies the acquired IP address and transmits print data for instructing printing execution, to the MFP 10.

The MFP 10 performs data communication with a communication apparatus belonging to a large-scale network including a gateway (relay device) for performing intercommunication between different protocols. For example, with an access point 17, the MFP 10 performs wired LAN communication with a mobile terminal 12c belonging to a LAN 16 connected to the LAN 11 through the gateway 15. Here, if the gateway 15 does not support the network service discovery protocol, such as mDNS, the network service discovery protocol does not function. Thus, the mobile terminal 12c cannot find the MFP 10 with the above-mentioned search processing. In order to solve the trouble, in the present embodiment, the MFP 10 transmits short-range wireless-communication information including address information, such as the IP address and MAC address of the MFP 10, to the mobile terminal 12c via short-range wireless communication. The short-range wireless communication includes Near Field Communication (NFC) and Bluetooth (registered trademark) Low Energy (BLE) communication.

Figure 2:
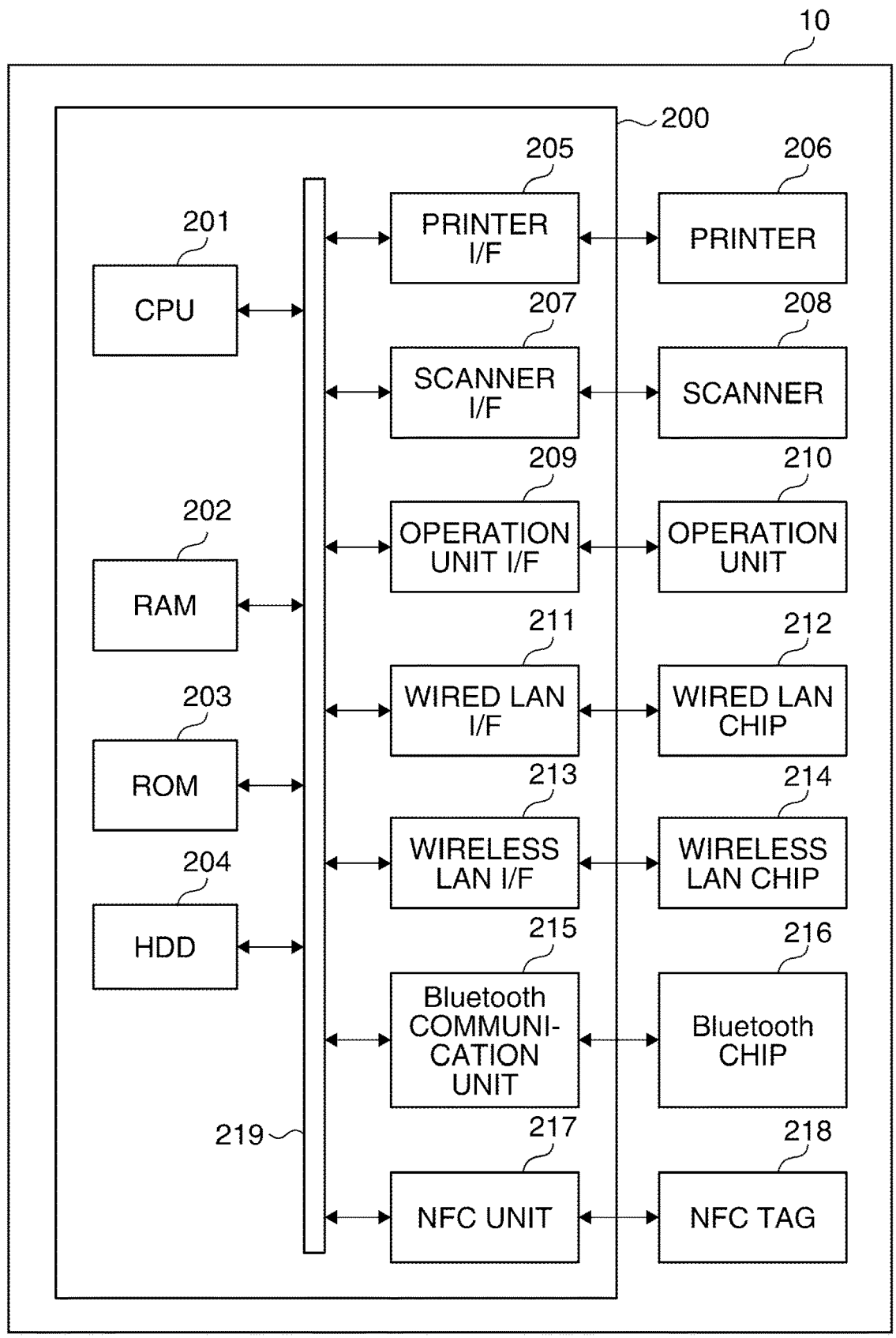
FIG. 2 is a block diagram schematically showing the hardware configuration of the MFP shown in FIG. 1.

FIG. 2 is a block diagram schematically showing the hardware configuration of the MFP 10 shown in FIG. 1.

In FIG. 2, the MFP 10 includes a control unit 200, a printer 206, a scanner 208, an operation unit 210, a wired LAN chip 212, a wireless LAN chip 214, a Bluetooth chip 216, and an NFC tag 218. The control unit 200 is connected to the printer 206, the scanner 208, the operation unit 210, the wired LAN chip 212, the wireless LAN chip 214, the Bluetooth chip 216, and the NFC tag 218. The control unit 200 includes a CPU 201, a RAM 202, a ROM 203, an HDD 204, a printer I/F 205, a scanner I/F 207, and an operation unit I/F 209. The control unit 200 includes a wired LAN I/F 211, a wireless LAN I/F 213, a Bluetooth communication unit 215, and an NFC unit 217. The CPU 201, the RAM 202, the ROM 203, the HDD 204, the printer I/F 205, and the scanner I/F 207 are mutually connected through a system bus 219. In addition, the operation unit I/F 209, the wired LAN I/F 211, the wireless LAN I/F 213, the Bluetooth communication unit 215, and the NFC unit 217 are mutually connected through the system bus 219.

The MFP 10 is an image forming apparatus that performs image forming processing, and has a printing function, a scanning function, and a communication function. The control unit 200 controls the operation of the entire MFP 10. The CPU 201 reads a control program stored in the ROM 203 or the HDD 204, to perform each type of control. The RAM 202 is used as a work area for the CPU 201 and as a temporary storage area for each piece of data. The ROM 203 stores a control program and so on to be executed by the CPU 201. The HDD 204 stores a program, print data, a scanned image and so on. The printer I/F 205 connects the control unit 200 with the printer 206. The printer 206 performs printing on a sheet of paper, on the basis of print data received from a communication apparatus, such as the mobile terminal 12a, 12b, or 12c, or a scanned image generated by the scanner 208. The scanner I/F 207 connects the control unit 200 with the scanner 208. The scanner 208 scans an original disposed on a platen (not shown), to generate a scanned image. The generated scanned image is stored in the HDD 204.

The operation unit I/F 209 connects the control unit 200 with the operation unit 210. The operation unit 210 includes a liquid crystal display unit (not shown) having a touch panel function and a keyboard (not shown), through which the operation unit 210 receives an execution instruction for a job or a setting change instruction for the MFP 10 or the like. The wired LAN I/F 211 performs wired LAN communication with a communication apparatus through the wired LAN chip 212. The wireless LAN I/F 213 performs wireless LAN communication with a communication apparatus through the wireless LAN chip 214. In the present embodiment, the MFP 10 has a single-line mode which uses the wired LAN I/F 211 or the wireless LAN I/F 213 and a multiple-line mode which uses both of the wired LAN I/F 211 and the wireless LAN I/F 213. A user can set a mode to be used, with an operation screen 300 shown in FIG. 3 to be described later, displayed on the operation unit 210. The Bluetooth communication unit 215 controls BLE communication with a communication apparatus. For example, the Bluetooth communication unit 215 sends, from the Bluetooth chip 216, a beacon signal including the short-range wireless-communication information at predetermined intervals previously set, via the BLE communication. The beacon signal includes the address information regarding the MFP 10. The NFC unit 217 controls NFC performed with a communication apparatus. For example, the NFC unit 217 transmits, from the NFC tag 218, the short-range wireless-communication information via the NFC.

Figure 3:
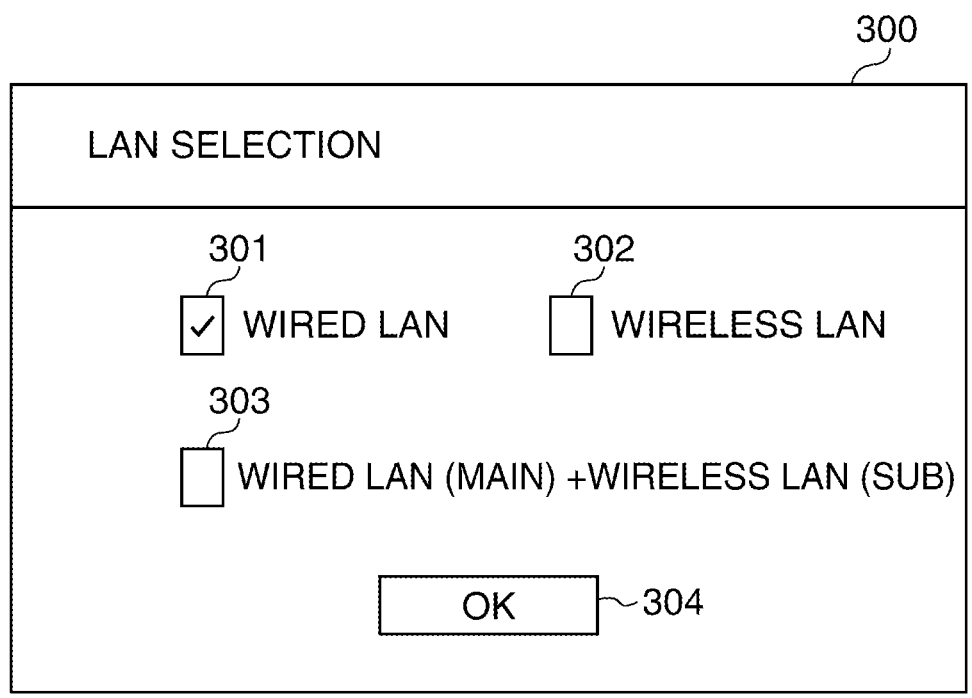
FIG. 3 is a view showing an exemplary operation screen to be displayed on an operation unit shown in FIG. 2.

FIG. 3 is a view showing an example of the operation screen 300 to be displayed on the operation unit 210 shown in FIG. 2.

The operation screen 300 includes check boxes 301 to 303 and an OK button 304. The user can select one check box from the check boxes 301 to 303. In a case where the check box 301 is selected, the MFP 10 has the single-line (wired) mode set. The single-line (wired) mode allows only the wired LAN I/F 211 to be used out of the wired LAN I/F 211 and the wireless LAN I/F 213. In a case where the check box 302 is selected, the MFP 10 has the single-line (wireless) mode set. The single-line (wireless) mode allows only the wireless LAN I/F 213 to be used out of the wired LAN I/F 211 and the wireless LAN I/F 213.

In a case where the check box 303 is selected, the MFP 10 has the multiple-line mode set. The multiple-line mode allows both of the wired LAN I/F 211 and the wireless LAN I/F 213 to be used. Specifically, the multiple-line mode allows the wired LAN I/F 211 to be used as the main line and the wireless LAN I/F 213 to be used as the sub-line. In the present embodiment, as an example, the main line has a large-scale network including the LAN 11 and the LAN 16, and the gateway 15 is included in the main line. Meanwhile, the sub-line has a small-scale network including only the LAN 14, and no gateway is included in the sub-line. The multiple-line mode allows respective different IP addresses to be assigned to the lines. The IP address assigned for the main line and the IP address assigned for the sub-line are defined as the IP address of the main line and the IP address of the sub-line, respectively, below. When the OK button 304 is selected, a set value indicating the mode set through the operation screen 300 is stored in the HDD 204.

The MFP 10 transmits the short-range wireless-communication information including the address information regarding the MFP 10, to a mobile terminal in which mDNS does not function, via the short-range wireless communication. In a case where the multiple-line mode is set, the MFP 10 has the respective different IP addresses assigned to the main line and the sub-line. However, due to the specifications of the short-range wireless communication, only the IP address of either the main line or the sub-line can be set in the short-range wireless-communication information. There is a possibility that mDNS does not function due to the specifications of the gateway 15 in the main line, out of the main line and the sub-line, having the large-scale network including the gateway 15, in the MFP 10. From the viewpoint of provision of an appropriate IP address to a mobile terminal in which mDNS does not function, the MFP 10 preferably has the IP address of the main line, out of the main line and the sub-line, set in the short-range wireless-communication information. However, because an IP address to be set in the short-range wireless-communication information is determined from all IP addresses assigned to the MFP 10, the IP address of the main line is not always set in the short-range wireless-communication information. That is, the conventional MFP cannot provide an appropriate IP address to a mobile terminal in which mDNS does not function.

In order to solve the trouble, in the present embodiment, the IP address corresponding to the main line, out of the main line and the sub-line, including the gateway 15 provided between the MFP 10 and the communication destination is preferentially set in the short-range wireless-communication information.

Figure 4:
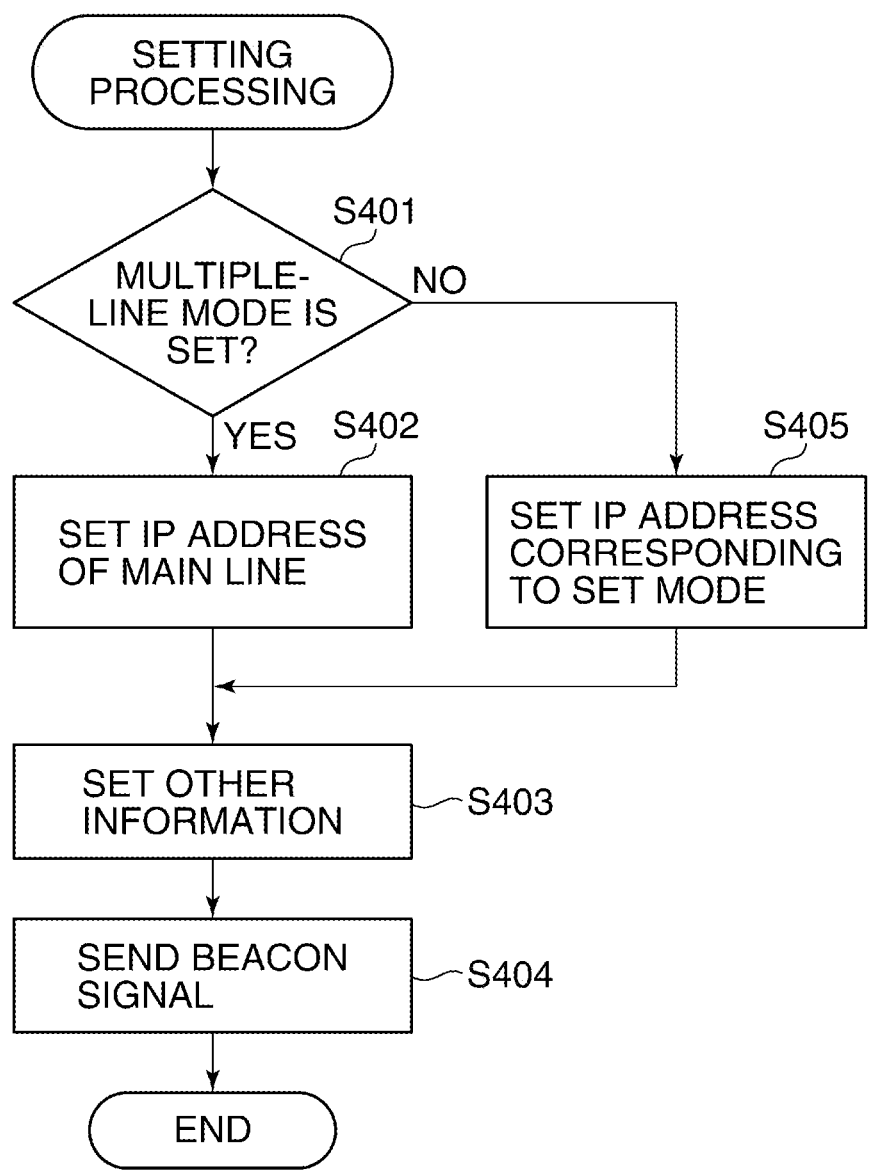
FIG. 4 is a flowchart showing the procedure of setting processing to be performed by the MFP shown in FIG. 1.

FIG. 4 is a flowchart showing the procedure of setting processing to be performed by the MFP 10 shown in FIG. 1.

The CPU 201 executes a program stored in the ROM 203 or the HDD 204, to perform the processing shown in FIG. 4. The processing shown in FIG. 4 is performed when the MFP 10 starts up or when a setting change is made through the operation screen 300. In the processing shown in FIG. 4, the IP address of the MFP 10 is set in a beacon signal that is exemplary short-range wireless-communication information.

In FIG. 4, the CPU 201 first determines whether or not the line mode set through the operation screen 300 is the multiple-line mode (step S401).

Figure 5:
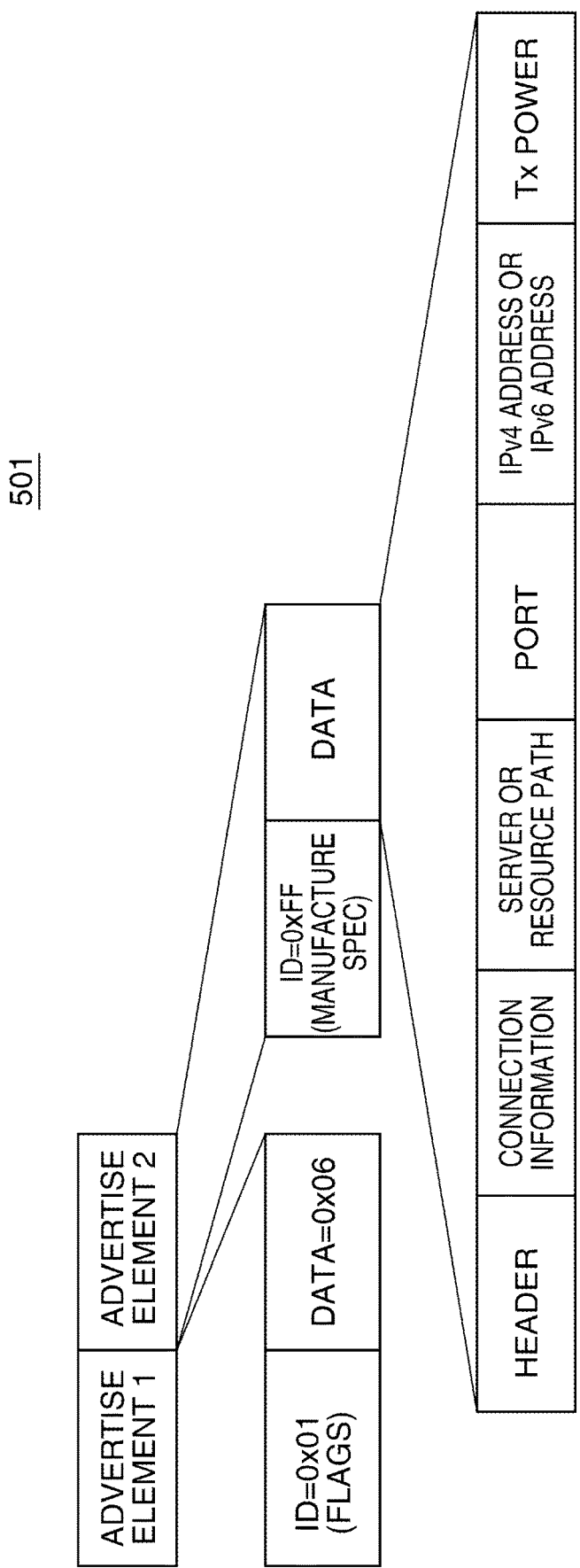
FIG. 5 is a diagram for describing the configuration of a beacon signal to be transmitted by the MFP shown in FIG. 1.

In a case where the set line mode is the multiple-line mode as a result of the determination at step S401, the CPU 201 sets the IP address of the main line into a beacon signal 501 shown in FIG. 5 (step S402). That is, in the present embodiment, the IP address corresponding to the main line, out of the main line and the sub-line, including the gateway 15 provided between the MFP 10 and the communication destination is preferentially set into the beacon signal 501. The beacon signal 501 includes information necessary for communication with the MFP 10 (hereinafter, referred to as "communication information for the MFP 10"), specifically, connection information, a path information, a port number, an IP address, and transmission radio-field intensity information.

Next, the CPU 201 sets the information excluding the IP address out of the communication information for the MFP 10, into the beacon signal 501 (step S403), and sends the beacon signal 501 at predetermined intervals previously set (step S404). Then, the CPU 201 terminates the present processing.

In a case where the set line mode is not the multiple-line mode as a result of the determination at step S401, the CPU 201 sets the IP address corresponding to the mode set through the operation screen 300, into the beacon signal 501 (step S405). At step S405, in a case where the single-line (wired) mode is set through the operation screen 300, the CPU 201 sets the IP address assigned for the wired LAN communication performed with the wired LAN I/F 211, into the beacon signal 501. In a case where the single-line (wireless) mode is set through the operation screen 300, the CPU 201 sets the IP address assigned for the wireless LAN communication performed with the wireless LAN I/F 213, into the beacon signal 501. Next, the CPU 201 performs the processing at and after step S403. When a communication apparatus capable of analyzing the beacon signal 501, for example, the mobile terminal 12c receives the beacon signal 501, the mobile terminal 12c displays the MFP 10 as an available MFP for printing, on the basis of the information acquired from the beacon signal 501 received.

In the processing of FIG. 4 described above, the IP address corresponding to the main line, out of the main line and the sub-line, including the gateway 15 provided between the MFP 10 and the communication destination, is preferentially set into the beacon signal 501. This arrangement can provide an appropriate IP address to the mobile terminal 12c in which mDNS does not function.

The present invention has been described with the embodiment described above, but the present invention is not limited to the embodiment described above. For example, the MFP 10 may have three or more lines assigned with different IP addresses. For example, in a case where a first line includes the gateway 15 provided between the MFP 10 and the communication destination and second line and third line each do not include the gateway 15 between the MFP 10 and the communication destination side, the IP address of the first line is preferentially set into the beacon signal 501. This arrangement can achieve an effect similar to that in the embodiment described above.

Figure 6:
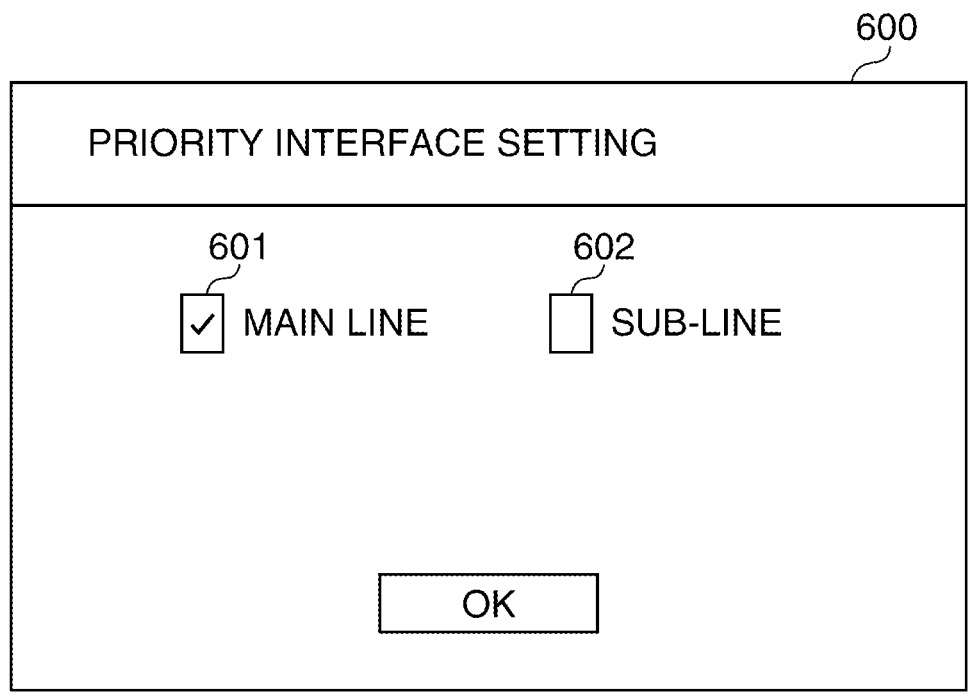
FIG. 6 is a view showing an exemplary selecting screen to be displayed on the operation unit shown in FIG. 2.

Other than the main line, the sub-line may be used in the large-scale network including the gateway 15. In this case, the user may select an IP address to be set into the beacon signal 501, with a selecting screen 600 shown in FIG. 6. A line corresponding to an IP address to be set into the beacon signal 501 is set through the selecting screen 600. The selecting screen 600 includes check boxes 601 and 602. In a case where the check box 601 is selected, the IP address of the main line is set in the beacon signal 501. In a case where the check box 602 is selected, the IP address of the sub-line is set in the beacon signal 501. This arrangement can provide the IP address of the line desired by the user, to the mobile terminal 12c via the BLE communication.

In the embodiment described above, in a case where only the main line, out of the main line and the sub-line, is used for the large-scale network including the gateway 15 the IP address of the main line may be set into the beacon signal 501 regardless of the setting through the selecting screen 600. This arrangement can avoid user's wrong setting through the selecting screen 600 in a case where only the main line, out of the main line and the sub-line, is used for the large-scale network including the gateway 15.

In the embodiment described above, in a case where only the main line is used for the large-scale network including the gateway 15 and the IP address corresponding to a line different from the line set through the selecting screen 600 is set into the beacon signal 501, a notification indicating that effect can be displayed on the operation unit 210. Specifically, in a case where the IP address of the main line is set into the beacon signal 501 in spite of selection of the check box 602 on the selecting screen 600, the following control is performed. The CPU 201 displays, onto the operation unit 210, the notification indicating the effect that the IP address of the line different from the line set through the selecting screen 600 has been set in the beacon signal 501. This arrangement can notify the user that an IP address different from the IP address set by the user is going to be transmitted via the BLE communication, before the user acquires the IP address of the MFP 10 with the mobile terminal 12c or the like via the BLE communication.

Furthermore, in the embodiment described above, in a case where only the main line is used for the large-scale network including the gateway 15, the check box 602 corresponding to the sub-line may be controlled not to be selected by the user through the selecting screen 600. For example, the CPU 201 does not allow the selecting screen 600 to receive a selecting operation of the check box 602 by the user, but displays the check box 602 in gray on the operation unit 210 to indicate that a selecting operation of the check box 602 is not allowed. Alternatively, the CPU 201 does not display the check box 602 in the selecting screen 600. This arrangement can avoid a situation in which the user sets an IP address that is not the IP address of the main line into the beacon signal 501 in a case where only the main line out of the main line and the sub-line is used for the large-scale network including the gateway 15.

In the embodiment described above, the short-range wireless communication is not limited to the BLE communication, and may be the NFC. For example, in a case where the set line mode is the multiple-line mode, the CPU 201 sets the IP address of the main line into the short-range wireless-communication information. Meanwhile, in a case where the set line mode is not the multiple-line mode, the CPU 201 sets the IP address corresponding to the set mode into the short-range wireless-communication information. After that, for example, when the mobile terminal 12c comes close to the NFC tag 218 of the MFP 10, the CPU 201 transmits the short-range wireless-communication information to the mobile terminal 12c via the NFC. This arrangement can achieve an effect similar to that in the embodiment described above.

In the embodiment described above, an IP address to be set may be determined on the basis of the type of a beacon signal.

Figure 7:
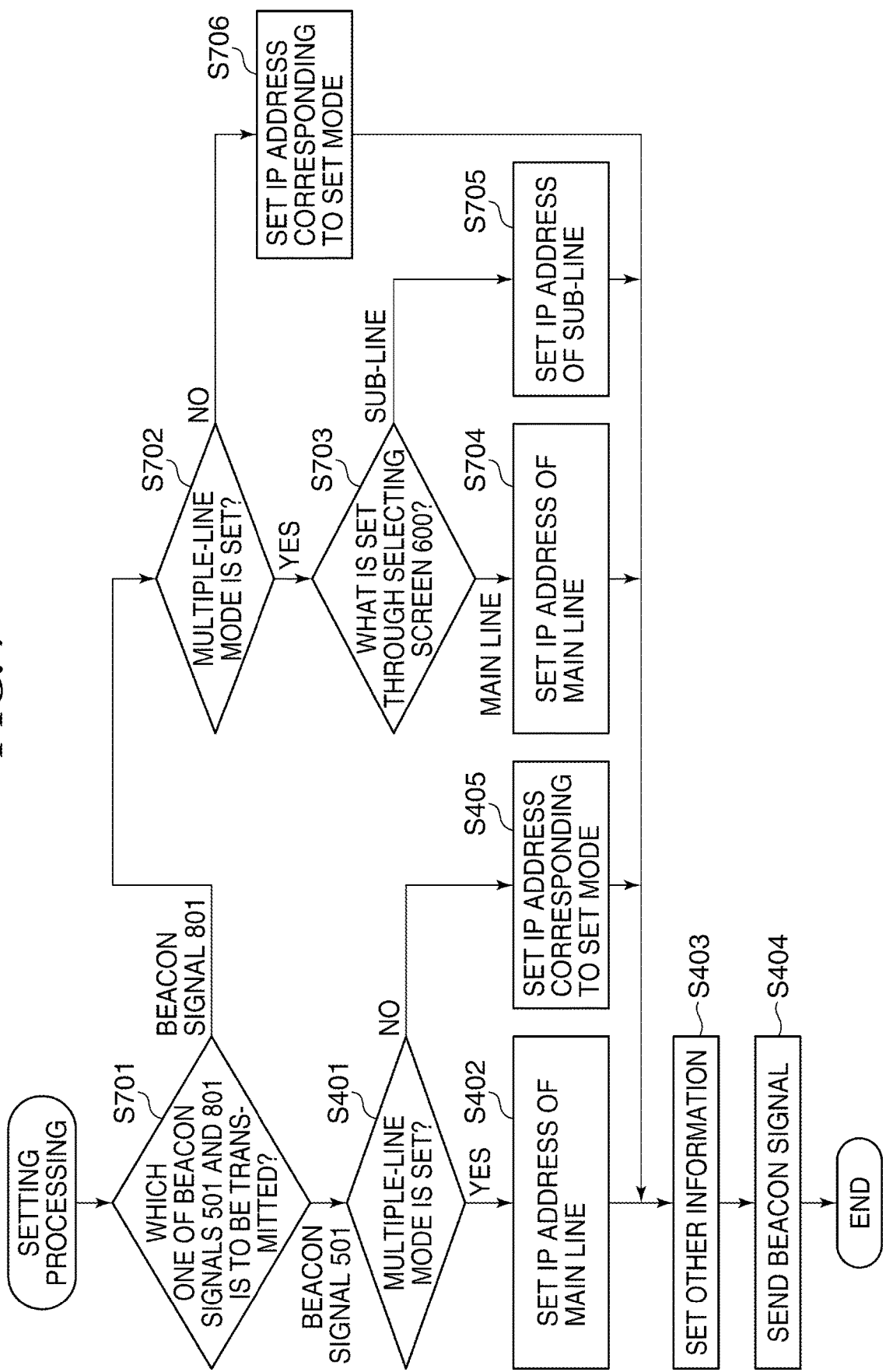
FIG. 7 is a flowchart showing the procedure of a variation of the setting processing shown in FIG. 4.

FIG. 7 is a flowchart showing the procedure of a variation of the setting processing shown in FIG. 4.

The CPU 201 executes a program stored in the ROM 203 or the HDD 204, to perform the processing shown in FIG. 7. The processing shown in FIG. 7 is performed when the MFP 10 starts up or when a setting change is made through the operation screen 300. In the processing shown in FIG. 7, the address information regarding the MFP 10 is set in a beacon signal that is exemplary short-range wireless-communication information.

Figure 8:
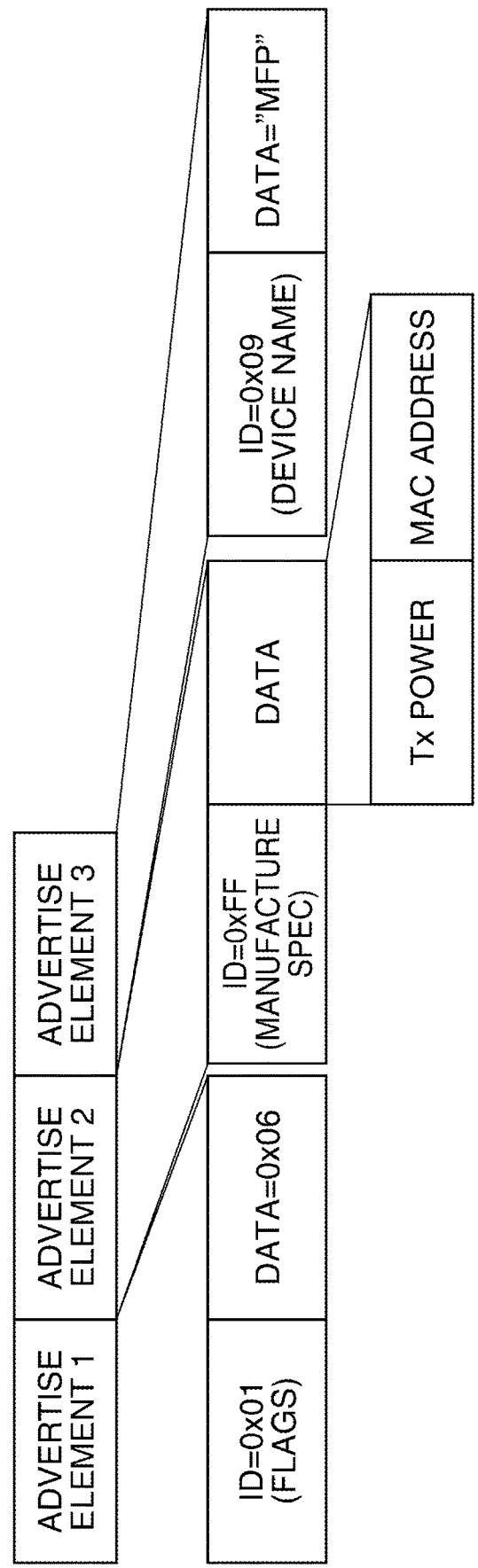
FIG. 8 is a diagram for describing the configuration of a beacon signal to be transmitted by the MFP shown in FIG. 1.
Figure 9:
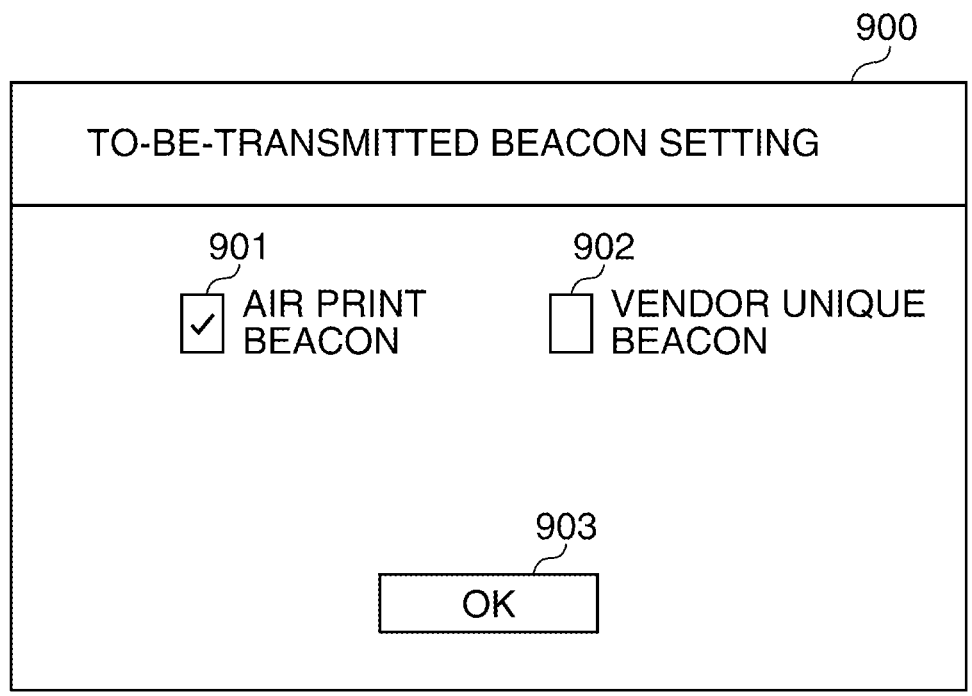
FIG. 9 is a view showing an exemplary setting screen to be displayed on the operation unit shown in FIG. 2.

The MFP 10 can transmit a beacon signal 801 shown in FIG. 8 other than the beacon signal 501. The beacon signal 801 includes the MAC address of the MFP 10, a device name, transmission radio-field intensity, and the like as the communication information for the MFP 10. It should be noted that, in the present embodiment, the IP address of the MFP 10 may be set into the beacon signal 801. When a communication apparatus capable of analyzing the beacon signal 801, for example, the mobile terminal 12c receives the beacon signal 801, the mobile terminal 12c specifies the MFP 10 on the basis of the MAC address and the device name included in the beacon signal 801. The mobile terminal 12c calculates a distance from the mobile terminal 12c to the MFP 10, on the basis of the transmission radio-field intensity, to perform the processing based on the calculated distance. The user can set, for the MFP 10, a beacon signal to be transmitted by the MFP 10 from the beacon signals 501 and 801 through a setting screen 900 shown in FIG. 9. The MFP 10 allows the user to select either a check box 901 corresponding to the beacon signal 501 or a check box 902 corresponding to the beacon signal 801. Then, when the user selects an OK button 903, the set content on the setting screen 900 is reflected.

In FIG. 7, the CPU 201 first refers to the setting made through the setting screen 900 to determine which one of the beacon signals 501 and 801 is to be transmitted by the MFP 10 (step S701).

In a case where it is determined that the beacon signal 501 is transmitted as a result of the determination at step S701, the CPU 201 performs the processing at steps S401 to S405. Meanwhile, in a case where it is determined that the beacon signal 801 is transmitted as a result of the determination at step S701, the CPU 201 determines whether or not the set line mode through the operation screen 300 is the multiple-line mode (step S702).

In a case where it is determined that the set line mode is the multiple-line mode as a result of the determination at step S702, the CPU 201 determines the setting set through the selecting screen 600 (step S703).

In a case where it is determined that the main line has been set through the selecting screen 600 as a result of the determination at step S703, the CPU 201 sets the IP address of the main line into the beacon signal 801 (step S704) and performs the processing at and after step S403.

In a case where it is determined that the sub-line has been set through the selecting screen 600 as a result of the determination at step S703, the CPU 201 sets the IP address of the sub-line into the beacon signal 801 (step S705) and performs the processing at and after step S403.

In a case where it is determined that the set line mode is not the multiple-line mode as a result of the determination at step S702, the CPU 201 sets the IP address corresponding to the set mode through the operation screen 300, into the beacon signal 801 (step S706). At step S706, in a case where the single-line (wired) mode is set through the operation screen 300, the CPU 201 sets the IP address assigned for the wired LAN communication performed with the wired LAN I/F 211, into the beacon signal 801. In a case where the single-line (wireless) mode is set through the operation screen 300, the CPU 201 sets the IP address assigned for the wireless LAN communication performed with the wireless LAN I/F 213, into the beacon signal 801. Next, the CPU 201 performs the processing at and after step S403.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-176993, filed Sep. 14, 2017, which is hereby incorporated by reference wherein in its entirety.

What is claimed is:

1. An information processing apparatus comprising:
a first network interface;
a second network interface, wherein the first and second network interfaces are assigned with mutually different IP addresses;
a short-range wireless communication interface configured to transmit short-range wireless-communication information including address information for connecting to the information processing apparatus;
at least one memory that stores a set of instructions; and
at least one processor that executes the instructions to cause the information processing apparatus to:
set, in a case where the information processing apparatus uses the first network interface and the second network interface for network communication, and uses only the first network interface out of the first and second network interfaces for communicating with a communication device belonging to a first subnet different from a second subnet to which the information processing device belongs, through a gateway that is provided between the information processing apparatus and the communication device, into the short-range wireless-communication information, address information regarding only the first network interface,
wherein the address information regarding the first network interface includes the IP address assigned to the first network interface.

2. The information processing apparatus according to claim 1, wherein the instructions further include an instruction for causing the information processing apparatus to select a network interface out of the network interfaces of the information processing apparatus corresponding to address information to be set in the short-range wireless-communication information, based on a user operation,
wherein, in a case where the information processing apparatus uses the first network interface and the second network interface for network communication, and both the first network interface and the second network interface can be used for communicating to a communication device through a gateway provided on a network to which the network interface belongs, the address information regarding only the network interface selected by the user is set into the short-range wireless-communication information, wherein the address information regarding the selected network interface includes the IP address of the selected network interface.

3. The information processing apparatus according to claim 1, wherein the instructions further include an instruction for causing the information processing apparatus to select a network interface out of the network interfaces of the information processing apparatus corresponding to address information to be set in the short-range wireless-communication information, based on a user operation,
wherein, in a case where only the first network interface is used for communicating with the communication device belonging to the first subnet, the address information regarding only the first network interface is set into the short-range wireless-communication information, regardless of the selection of the user operation.

4. The information processing apparatus according to claim 3, wherein the instructions further include an instruction for causing the information processing apparatus to notify the user that the address information regarding the first network interface which is different from the network interface selected by the user operation has been set into the short-range wireless-communication information, in a case where the second network interface is selected based on the user operation.

5. The information processing apparatus according to claim 3, wherein the instructions further include an instruction for causing the information processing apparatus to control, to restrict the second network interface from being selected by the user operation, in a case where only the first network interface is used for communicating with the communication device belonging to the first subnet.

6. The information processing apparatus according to claim 1, wherein the short-range wireless communication interface is either Near Field Communication (NFC) interface or Bluetooth Low Energy (BLE) communication interface.

7. The information processing apparatus according to claim 1, wherein the information processing apparatus is an image forming apparatus that performs image forming processing.

8. A control method for an information processing apparatus having a first network interface and a second network interface, wherein the first and second network interfaces are assigned with mutually different IP addresses the control method comprising:
setting, in a case where the information processing apparatus uses the first network interface and the second network interface for network communication, and uses only the first network interface out of the first and second network interfaces for communicating with a communication device belonging to a first subnet different from a second subnet to which the information processing device belongs, through a gateway that is provided between the information processing apparatus and the communication device, into a short-range wireless-communication information, address information regarding only the first network interface, transmitting the short-range wireless-communication information, to an external device via a short-range wireless communication, wherein the address information regarding the first network interface includes the IP address assigned to the first network interface.

9. A computer-readable non-transitory storage medium storing a program for causing a computer to execute a control method for an information processing apparatus having a first network interface and a second network interface, wherein the first and second network interfaces are assigned with mutually different IP addresses the control method comprising:

setting, in a case where the information processing apparatus uses the first network interface and the second network interface for network communication, and uses only the first network interface out of the first and second network interfaces for communicating with a communication device belonging to a first subnet different from a second subnet to which the information processing device belongs, through a gateway that is provided between the information processing apparatus and the communication device, into a short-range wireless-communication information, address information regarding only the first network interface, transmitting the short-range wireless-communication information, to an external device via a short-range wireless communication, wherein the address information regarding the first network interface includes the IP address assigned to the first network interface.

10. The control method according to claim 8, the method further comprising:

selecting, by the information processing apparatus, a network interface out of the network interfaces of the information processing apparatus corresponding to address information to be set in the short-range wireless-communication information, based on a user operation, wherein, in a case where the information processing apparatus uses the first network interface and the second network interface for network communication, and both the first network interface and the second network interface can be used for communicating to a communication device through a gateway provided on a network to which the network interface belongs, the address information regarding only the network interface selected by the user is set into the short-range wireless-communication information, wherein the address information regarding the selected network interface includes the IP address of the selected network interface.

11. The control method according to claim 8, the method further comprising:

selecting, by the information processing apparatus, a network interface out of the network interfaces of the information processing apparatus corresponding to address information to be set in the short-range wireless-communication information, based on a user operation, wherein, in a case where only the first network interface is used for communicating with the communication device belonging to the first subnet, the address information regarding only the first network interface is set into the short-range wireless-communication information, regardless of the selection of the user operation.

12. The control method according to claim 11, the method further comprising:

notifying, by the information processing apparatus, the user that the address information regarding the first network interface which is different from the network interface selected by the user operation has been set into the short-range wireless-communication information, in a case where the second network interface is selected based on the user operation.

13. The control method according to claim 11, the method further comprising:

controlling, by the information processing apparatus, to restrict the second network interface from being selected by the user operation, in a case where only the first network interface is used for communicating with the communication device belonging to the first subnet.

14. The control method according to claim 8, wherein the short-range wireless communication interface is either Near Field Communication (NFC) interface or Bluetooth Low Energy (BLE) communication interface.

15. The control method according to claim 8, wherein the information processing apparatus is an image forming apparatus that performs image forming processing.

* * * * *